United States Patent [19]

Akerberg et al.

[11] 4,430,459

[45] Feb. 7, 1984

[54] METHOD AND COMPOSITION FOR A FURAN-MODIFIED PHENOLIC NOVOLAK BINDER SYSTEM

[75] Inventors: Denis W. Akerberg, Huntley; George W. Huffman, Crystal Lake; Carl A. Rude, Cary, all of Ill.

[73] Assignee: The Quaker Oats Company, Chicago, Ill.

[21] Appl. No.: 346,309

[22] Filed: Feb. 5, 1982

Related U.S. Application Data

[62] Division of Ser. No. 194,118, Oct. 6, 1980, Pat. No. 4,348,343.

[51] Int. Cl.$^3$ .......................... C08K 3/34; C08K 3/04
[52] U.S. Cl. ................................. 523/144; 524/511; 428/404
[58] Field of Search ............... 523/144; 524/511, 541; 525/502, 491; 428/404

[56] References Cited

U.S. PATENT DOCUMENTS

| | | | |
|---|---|---|---|
| 2,965,601 | 12/1960 | Brown | 525/502 |
| 3,725,333 | 4/1973 | Adkins et al. | 523/144 |
| 3,755,229 | 8/1973 | Johnson et al. | 524/541 |

FOREIGN PATENT DOCUMENTS

| | | | |
|---|---|---|---|
| 57937 | 9/1969 | Poland | 523/144 |

*Primary Examiner*—Lewis T. Jacobs
*Attorney, Agent, or Firm*—G. T. Shekleton; Karen E. Ayd; J. P. O'Halloran

[57] ABSTRACT

A method and composition for forming a dry free-flowing particulate solid is disclosed which utilizes a novel binder system for bonding particles of carbon, sand and/or other solid particulate materials. The solid, non-sticky binder system comprises furfural, solid resin, (such as a phenolic resin), which is not sticky at room temperature and is soluble in furfural, and a liquid amine having free hydrogens on the amine nitrogen which amine is capable of reacting with furfural. This system is capable of adhering to such particles while retaining the free-flowing characteristics of the particles. The free-flowing particulate solid thus formed may be shaped, extruded or compression molded as necessary to form the desired article. A shaped mass of this particulate material is converted to an integral mass by warming or compressing. While the binder is curable at room temperature over a long period of time, the cure rate may be accelerated by increases in temperature. Carbonization of the resin system yields a high carbon residue.

6 Claims, No Drawings

METHOD AND COMPOSITION FOR A FURAN-MODIFIED PHENOLIC NOVOLAK BINDER SYSTEM

This application is a division of Ser. No. 194,118 filed Oct. 6, 1980, now U.S. Pat. No. 4,348,343, issued Sept. 7, 1982.

BACKGROUND OF THE INVENTION

This application relates in general to a method for forming a resin binder system and more preferably to a method for forming a resin binder system of a furfural-phenolic resin system.

Furan modified phenolics have found great favor recently, largely because of their capability of providing high carbon content, high strength and thermosetting characteristics. However, because of the liquid nature of such furan phenolics, difficulties in their use were presented. For example, mixing with sand to form a foundry shape produced a heavy, sticky or viscous mix which was hard to work with. Mixing with carbon for subsequent molding or extrusion produced a sticky mix with little green strength.

Attempts to solve the above problem to render furan modified phenolics more acceptable for use with refractory materials in forming desired shapes and articles, as typified by U.S. Pat. No. 4,051,301 to Laitar, have resulted in a solid thermoplastic resin which, when added to a refractory material such as sand, had to be heated or otherwise dissolved to result in a free-flowing particulate mix that can be converted to a hard rigid thermoset article. However, this desirable end result is achievable only through the use of an expensive formulation procedure, thereby putting the resin in an unfavorable economic position with traditional phenolic novolaks.

SUMMARY OF THE INVENTION

An object of the present invention is a free-flowing non-sticky particulate mixture of a high furfural content binder and a solid particulate material.

An additional object of this present invention is an economical free-flowing particulate mixture having a binder of a furan-modified phenolic.

An object of the subject invention is a furan-modified phenolic binder which has a long storage life.

Another additional object of the present invention is a solid non-sticky thermoplastic furan-modified phenolic binder which can be handled and processed at room temperatures and yet is thermosetting at moderate temperatures.

A still further object of the present invention is a catalyzed, long bench life coated particulate mixture capable of being converted to an integral mass by warming or pressure.

These and other objects of the present invention are provided by the method and composition for forming a free-flowing stable particulate mix having a binder of a high furfural content system, such as, for example, a furfural-phenolic resin system. A preferred binder system is generally formed by admixing a liquid blend of a solid non-sticky novolak resin and furfural to a particulate material having a small amount of the liquid amine uniformly dispersed thereon. Mixing is continued until the entire mass breaks into a free-flowing particulate mixture. The resulting particulate material may be shaped, extruded, or compression molded, depending upon the desired end product, and is converted to an integral mass by warmth or compression.

Consider broadly, the objects of this invention are achieved by dissolving a solid non-sticky resin in furfural monomer in an amount sufficient to reduce the viscosity of the solution to a level at which the solution can be uniformly admixed with a particulate solid material such as carbon, sand, glass fibers, other refractory materials, and the like. Upon addition of the resulting solution to particulate material containing the amine the resulting mass is transformed to a "dry" (i.e. no liquid) free-flowing particulate mass. The amines which are used are of the class which are liquid at ambient room temperatures, and capable of forming a reaction product with furfural.

DETAILED DESCRIPTION OF THE INVENTION

In a preferred embodiment of the subject invention a phenolic novolak resin is mixed with furfural so as to achieve a desired viscosity as will be discussed. Generally speaking, as used herein, the term "novolak" and "novolak resin" denote a condensation product such as is obtained by causing a phenol to condense with less than an equimolar portion of an aldehyde or a ketone, in an acidic environment. Structurally the molecules of a novolak consist essentially of alkyl-substituted or unsubstituted phenyl nuclei connected together by methylene or substituted methylene links.

To form a preferred novolak suitable for use in the subject invention a mixture of phenol and aqueous formaldehyde is prepared at a ratio of 1.15 moles phenol to 1.00 moles of formaldehyde. A sufficient quantity of oxalic acid is admixed therewith to provide a pH of about 1.0 and the reaction mixture is allowed to react under atmospheric reflux temperature conditions until all of the formaldehyde disappears. Thereafter, a sufficient quantity of aqueous sodium hydroxide is added to the reaction mixture to elevate the pH of the reaction mixture to approximately 6.3. Thereafter the refluxing condensor is removed and most of the water and unreacted phenol is allowed to be removed from the reaction mixture in the conventional reduced pressure distillation stripping step. The resulting resin is a solid at room temperature. While reference is made herein to a specific manner of preparing a solid novolak, other methods as are known and accepted in the art may be utilized.

To the novolak prepared as indicated above, furfural is added in sufficient quantities to achieve a desired viscosity. The furfural may be either added to the novolak while still in melted condition in the novolak reactor or solid novolak may be added to the furfural. For long term storage stability the pH of the resulting furfural solution should preferably be adjusted to 3.5–4.0. However a pH value of 1–7 is useful. The following table indicates approximate amounts of furfural as percentages of the whole mixture which may be added to the novolak to obtain a given viscosity.

TABLE I

| % Furfural | Viscosity (cps) |
|---|---|
| 44% | 3000 |
| 48% | 900 |
| 53% | 400 |
| 57% | 250 |
| 69% | 180 |

TABLE I-continued

| % Furfural | Viscosity (cps) |
|---|---|
| 74% | 65 |

The furfural-novolak solution thus prepared has a long shelf life at room temperature and, though liquid and completely adjustable in viscosity, is completely reactive, all components becoming a part of the solids of the cured resin. However, inclusion of the reactive amine with this solution, in accordance with the present invention, converts it to an uncured but solid, non-sticky condition. The resulting solid is thermoplastic. However, because the amine can convert the system into a thermoset condition, the amine-containing admixture is a catalyzed binder system when dispersed on a particulate solid in accordance with the present invention.

Although the particulate solids coated in accordance with this invention contain the amines, they are essentially uncured and are capable of becoming plastic or semi-liquid on heating. This allows the particulate solids to be molded or extruded. When furfural is added to the novolak in an amount more than double that of the novolak by weight the excess would appear to be wasteful. The minimum amount of furfural to be added to the novolak is that which is sufficient to liquify the novolak. Furfural to novolak ratios of 0.6:1.0 to 2.0:1.0 are preferred.

Preferably the amines of the subject invention are liquid mono- or poly-amines having two or more free hydrogens on the amine nitrogen and a boiling point over 150° C. However lower boiling amines such as ammonia or ethylene diamine may be used. The most preferred amine is triethylenetetramine (TETA).

As a result of the six free hydrogens available in TETA for reaction with furfural molecules, a relatively small amount of the TETA will bind up at room temperature the liquid furfural in the furfural novolak mixture, transforming such a mixture into a thermoplastic solid. Thus when the TETA is initially dispersed on an aggregate such as sand or carbon, and the furfural-novolak resin blend added, the resin system essentially coats the sand or carbon particles, as will be discussed in greater detail hereinafter, with no free furfural, as evidenced by the absence of the pungent furfural odor. The result is a dry free-flowing particulate solid which has good bench life, and, while being thermoplastic, can be completely thermoset by baking at moderate temperatures. Alternatively the binder system can be cured at room temperature over a long period of time. The curing rate of the resin binder system can be adjusted by increasing or decreasing the amount of the amine. For instance the amount of 4 percent TETA based on the furfural present will provide greater shelf life at room temperature, while increasing the amount of TETA up to a maximum of 30 percent will increase the curing rate. The minimum amount of amine which can be used in accordance with this invention is the amount which will react with the furfural in the novolak-furfural solution to convert it at room temperature to an uncured solid. Mixing of the amine with the furfural resin solution is carred out at room temperature with cooling if the mixing conditions require cooling. Preferably the amine is added to the solid particulate substrate prior to addition of the furfural resin solution.

As stated above, the resin binder system of the subject invention is useful in forming articles and shapes from a wide variety of particulate solid material. The following examples illustrate some of those uses and are not to be taken as limiting in any respect. All parts and percentages, unless expressly stated to be otherwise, are by weight.

EXAMPLE I

Approximately 2 percent of triethylenetetramine (TETA) and 70–75 percent carbon particles are thoroughly blended. To this dry amine-carbon mixture is added 16–23 percent of a liquid mixture of the furfural-novolak resin, prepared as described above to have a viscosity of 2500 cps. The mixing apparatus was cooled throughout the blending of the ingredients. Within 10 minutes of the addition of the resin binder system, the temperature of the resulting mixture started dropping gradually from a peak of 50°–60° C. Mixing of the ingredients was continued for a total of twenty minutes when a dry, free-flowing particulate solid was obtained. No furfural fumes were observed to be emitted during the mixing procedure.

The free-flowing powder was later placed into a preheated (60°–65° C.) extruder and extruded through a die into rods. The resulting rods, upon being cooled to room temperature, were found to be very hard and solid, with good green strength. The green carbon rods were baked and thoroughly carbonized by baking in a reducing atmosphere with a programmed temperature rise to 650° C. and holding at that temperature for 48 hours. When carbonized, the rods had satisfactory density and resistivity for use as electrodes. No bleeding or cracking was observed. The stack gases from the carbonization furnace were reduced in objectionable gases.

In practice the carbon particle portion of the mix may be formed from a variety of carbon sources, the percentages of which may vary, according to availability and other considerations. An actual formulation may contain carbon in the form of baked scrap, i.e. that scrap already baked and subsequently rejected for reasons such as quality control, and green scrap or that scrap which has been extruded yet not baked. A petroleum product such as a high viscosity (1500 cps) oil, may also be added for lubrication purposes. The following formulations are set forth to show the range of ingredient compositions yielding satisfactory carbon rods.

TABLE II

| Ingredients | Formulation No. | | | | |
|---|---|---|---|---|---|
| | I | II | III | IV | V |
| Coarse Calcined Petroleum Coke | 44.8% | 38.5% | 40.1% | 43% | 36% |
| Baked Scrap | 29.8 | 26.0 | 26.6 | 20.0 | 32 |
| Green Scrap | — | 13.0 | 13.3 | 10.0 | 12.0 |
| Oil (1500 cps) | 0.9 | 0.8 | 0.9 | 2.8 | 2.8 |
| Furfural-Phenolic Resin System (2500 cps) | 23.3 | 20.3 | 17.8 | 22.0 | 15.7 |
| TETA | 1.2 | 1.0 | 1.3 | 2.2 | 1.5 |

EXAMPLE II 92.3 parts coke particles of one-quarter inch mesh or smaller were mixed with 0.7 parts TETA and 7 parts of the furfural phenolic resin blend (3000 cps) was added; the mixing action was continued for twenty minutes with cooling until a free-flowing granulated solid resulted. The free-flowing solid was compression molded into five inch cubes useful as a source of carbon when added to molten iron as a cupola melt ingredient.

EXAMPLE III 83.8 parts silicon carbide aggregate were mixed with 1.2 parts TETA. Fifteen parts of the furfural phenolic resin blend (3000 cps) was added to the dry silicon carbide and TETA; the mixing action was continued with cooling until a free-flowing granulated solid was attained. The granulated solid was formed into a crucible one foot in diameter by two feet in depth through a shaping mold having a conventional rotating scribe. The resulting green crucible shape was separated from the mold and cured at 65° C. for 24 hours. The cured crucible was then carbonized at 800° C. under a reducing atmosphere.

EXAMPLE IV 91.7 parts grated aggregate of calcined dead-burned magnesite having a particle size of no greater than one-quarter inch mesh and 3 parts fine carbon powder was blended with 0.3 parts TETA. Five parts of the furfural phenolic resin mixture (3000 cps) described above was added to the magnesite, carbon and TETA; mixing was continued until a dry free-flowing granulated solid resulted. The granulated solid was compression molded in the shape of a large brick at 145° C. A higher temperature is required to cure refractory bricks in this application because of the large size of the brick and its poor heat conductivity. Alternatively the brick may be cold-molded and then baked at 95° C. for 24 hours. The resulting refractory brick may be used to form furnace linings and the like.

EXAMPLE V 93.5 parts foundry sand, Wedron 5025, was mixed with 0.3 parts TETA. 3.5 parts of the furfural phenolic resin mixture (3000 cps) described above was added to the sand-TETA blend and mixed until a dry free-flowing solid resulted. A surplus quantity of the above mix is placed against a mold pattern heated to 175° C. for a sufficient time to produce a shell mold of desired thickness, for instance, 60 seconds. The mold was inverted and the surplus mix dropped into a conventional recovery sand unit. The resulting formed sand mold was removed from the pattern.

EXAMPLE VI 89 parts granulated carbon was blended with 1.0 parts hexamethylenetetramine. 10 parts of the furfural-phenolic resin (3000 cps) described previously was added and mixing was continued. A sticky, viscous lumpy mix resulted having a furfural odor. The sticky mix was incapable of being easily molded or handled.

EXAMPLE VII 89 parts granulated carbon was blended with 10 parts triethanolamine. 10 parts of the furfural-phenolic resin (3000 cps) described above was added and mixing continued. A sticky viscous lumpy mix having the distinct odor of furfural resulted. The sticky mix could not be easily molded or handled.

A review of the above examples will show that the use of the liquid aliphatic amine TETA, which has free hydrogens available for interaction with the furfural molecule, was capable of providing dry free-flowing mixtures with the furfural phenolic resins. The failure of both triethanolamine and hexamethylenetetramine to provide a dry free-flowing mix can be explained by their lack of free hydrogens on the amine linkages. The aliphatic structure of TETA and other similar amines provides the necessary free hydrogens for tying up the furfural molecules, resulting in the solid free-flowing mixture observed.

While applicants herein do not wish to be bound by any theory, it is believed that the individual aggregate particles of the particular refractory material used are coated with the furfural-phenolic-TETA resin complex. This solid uncured resin complex, though adhering to the refractory particle, does not cause the coated particles to adhere to each other, thus creating the free-flowing dry powder observed. When advanced to the cured state, for example by a long period of time at room temperature or by low temperatures such as 60° C. Upon heating, the coating on the individual particles becomes initially liquid as in thermoplastic resins, whereby the mass exhibits good molding and extrusion characteristics, the resulting shaped mass exhibiting good green strength, and finally setting to a hard, thermo-set rigid shape.

While the invention has been described with reference to a preferred embodiment, it will be understood by those skilled in the art that various changes may be made and equivalents may be substituted for elements thereof without departing from the cope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A free-flowing particulate solid material capable of being integrated into a unitary mass by heat or pressure and capable of being converted into a thermoset unitary mass, comprising:
   solid particulate material having coated thereon a furfural solution of a solid non-sticky resin soluble in furfural, wherein the solution has been transformed into an uncured solid thermoplastic condition by reaction of the furfural in the solution with the amine capable of forming a reaction product with the furfural, said amine being used in an amount sufficient to convert the furfural solution to a solid.

2. The material of claim 1 in which the resin is a novolak resin.

3. The composition of claim 1 wherein the solid particulate material includes carbon.

4. The composition of claim 1 wherein the solid particulate material comprises sand.

5. The composition of claim 1 wherein the solid particulate material comprises a dead-burned basic refractory.

6. The material of claim 1 wherein said thermoset unitary mass is baked and carbonized.

* * * * *